US007021426B2

(12) United States Patent
Griffioen et al.

(10) Patent No.: US 7,021,426 B2
(45) Date of Patent: Apr. 4, 2006

(54) OPTICAL CABLE INSTALLATION WITH CABLE LUBRICATOR

(75) Inventors: Willem Griffioen, Ter Aar (NL); Maja Keijzer, Delft (NL); Cornelis van 't Hul, Den Hoorn (NL); Willem Greven, Delfzijl (NL)

(73) Assignee: NKF Kabel B.V., (NL)

(*) Notice: Subject to any disclaimer, the term of this patent is extended or adjusted under 35 U.S.C. 154(b) by 0 days.

(21) Appl. No.: 10/990,704

(22) Filed: Nov. 17, 2004

(65) Prior Publication Data

US 2005/0067608 A1 Mar. 31, 2005

Related U.S. Application Data

(62) Division of application No. 10/194,034, filed on Jul. 11, 2002, now Pat. No. 6,848,541.

(51) Int. Cl.
*F16N 13/22* (2006.01)

(52) U.S. Cl. .................................... 184/15.2; 184/15.1

(58) Field of Classification Search .................. 184/14, 184/15.1, 15.2, 16, 17; 254/134.4, 134.3 R, 254/134.3 FT; 15/104.31, 104.33; 198/493
See application file for complete search history.

(56) References Cited

U.S. PATENT DOCUMENTS 3,916,925 A * 11/1975 Crump ....................... 134/172
4,185,809 A 1/1980 Jonnes
4,331,322 A 5/1982 Woodruff
4,468,003 A 8/1984 Nonclercq et al.
4,569,420 A 2/1986 Pickett et al.
4,749,059 A * 6/1988 Jonnes et al. ............. 184/15.1
4,822,005 A 4/1989 Aleshire
4,934,662 A 6/1990 Griffioen et al.
5,121,901 A 6/1992 Cassidy et al.
5,467,968 A * 11/1995 Proud et al. ............. 254/134.4
5,645,267 A 7/1997 Reeve et al.
5,699,996 A 12/1997 Boyle et al.
5,732,934 A 3/1998 Sano et al.
5,884,384 A 3/1999 Griffioen
5,946,788 A 9/1999 Griffioen et al.
5,950,298 A 9/1999 Griffioen et al.
5,971,035 A 10/1999 Griffioen
6,024,387 A 2/2000 Griffioen et al.
6,047,954 A 4/2000 Griffioen
6,089,546 A 7/2000 Griffioen et al.
6,115,937 A 9/2000 Griffioen
6,116,578 A 9/2000 Pruett (Continued)

FOREIGN PATENT DOCUMENTS

DE 4202147 A1 7/1993

(Continued)

*Primary Examiner*—David Fenstermacher
(74) *Attorney, Agent, or Firm*—Dennis T. Griggs

(57) ABSTRACT

A cable is installed in a protective duct or guide tube by means of blowing (and, optionally, synergetic pushing) and lubricating the cable during installation. Lubricating the cable is done after the cable exits from the cable blowing equipment and hence takes place in a pressurized airflow passage. A hollow chamber filled with foam-plugs saturated with lubricant forms the cable lubricator. Lubricant is wiped onto the cable as it moves through the pressurized lubrication compartment. A portion of the airflow used for propelling the cable during blowing installation is bypassed around the lubricator and injected into the duct trajectory downstream of the lubricator.

19 Claims, 5 Drawing Sheets

U.S. PATENT DOCUMENTS

| | | | |
|---|---|---|---|
| 6,129,341 | A | 10/2000 | Griffioen et al. |
| 6,173,107 | B1 | 1/2001 | Reeve et al. |
| 6,176,022 | B1 | 1/2001 | Willem |
| 6,311,953 | B1 | 11/2001 | Lang et al. |
| 6,328,283 | B1 | 12/2001 | Reeve et al. |
| 6,364,290 | B1 | 4/2002 | Barker |
| 6,402,123 | B1 | 6/2002 | Rivard |
| 6,405,998 | B1 | 6/2002 | Griffioen |

FOREIGN PATENT DOCUMENTS

| | | |
|---|---|---|
| FR | 2501927 | 9/1982 |
| FR | 2655783 | 6/1991 |
| JP | 2001309519 | 11/2001 |
| WO | WO 01/46735 | 6/2001 |

* cited by examiner

OPTICAL CABLE INSTALLATION WITH CABLE LUBRICATOR

CROSS-REFERENCE TO RELATED APPLICATION

This application is a divisional of U.S. application Ser. No. 10/194,034 filed Jul. 11, 2002, now U.S. Pat. No. 6,848,541, which is incorporated herein by reference.

BACKGROUND OF THE INVENTION

This invention is related generally to outside plant equipment for optical telecommunications networks, and in particular to methods and apparatus for installing fiber optic communication cables in ducts and conduits, including underground ducts and guide tubes that channelize the underground ducts.

Various factors must be considered when a fiber optic cable is installed in a protective duct. Some major concerns are the ease of installation and reduction in the amount of time needed to install the cable. Generally, it is desirable to install the longest continuous length of cable possible to reduce the number of splices needed for the cable run. Splices are time consuming to make and incur considerable installation costs. Moreover, it is not desirable to have a large number of splice joints in view of the relatively substantial signal damping caused by each joint in proportion to the total signal damping of the overall signal path.

Protective cable ducts have been channelized in an effort to satisfy these concerns. For this purpose, one or more guide tubes whose interior surfaces may have a lower coefficient of friction than the protective duct, are installed in the protective duct, thereby establishing separate channels in which cable, optionally at a later time, can be pulled through the protective duct over a greater length.

The installation of fiber optic cables by pulling has now largely been replaced by a combination of blowing and synergetic pushing of the cables, e.g., such as described in U.S. Pat. Nos. 4,850,569 and 4,934,662 to Griffioen et al. This method is being used now for a variety of cables and ducts, from small (4 mm optical cables in 7/5.5 mm guide tubes, and currently 1.6 mm optical fiber cables in 4/3.2 mm guide tubes) to large (35 mm copper balanced cables in 63/50 mm ducts).

The theory of this pushing and blowing technique is described in EP 0734 109 B1 (Griffioen). According to this theory, cables with only a little play in the duct can be installed over long distances. Although the stiffness of the cable contributes more to the friction when passing bends and windings (undulations) in the duct trajectory, pushing becomes more efficient because the cable has less play to develop buckling. Even so, frictional effects have limited the installation lengths attainable by pushing and blowing techniques. Improvements in cable lubrication have been made to overcome those frictional limitations.

During the early development of pushing/blowing installation, cable lubrication was done by leading the cable through a box in contact with a lubricant, e.g., paraffin oil, before entering the cable blowing equipment and the protective duct. That conventional method has two limitations: (a) The pusher wheels or capstans of most blowing equipments (most of them with the pusher wheels outside the pressurized space) slip over the cable when the cable is wet with lubricant, and (b) the seals from the cable inlet to the pressurized space scrape or blow away most of the lubricant.

For these reasons the method of lubricating a cable before it is launched has been abandoned by most operators. Instead, the duct is now lubricated before the cable is inserted. This is done by pouring a proper amount of lubricant into the duct, putting a foam plug behind and blowing the plug with lubricant through the duct. This method turned out to be a reliable and satisfactory way of lubricating conventional large diameter ducts. Another way to lubricate is pre-lubrication of the duct by the manufacturer (usually during the extrusion process).

Bundles of mini-tubes have been developed for use in telecommunications access networks, e.g., "Fiber To The Home" (FTTH) systems, for example as described in U.S. Pat. No. 6,572,081 entitled "Installation of Guide Tubes in a Protective Duct," assigned to the owner of the present application and incorporated herein by reference. Here the mini-tubes become smaller and smaller, making it more difficult to lubricate with foam-plugs. More importantly, blowing many cables from one point to many different end-locations (houses or offices), and lubricating them with a blown foam plug every time, is rather impractical. Pre-lubricated ducts (by the manufacturer) have turned out to be not always reliable. A solution to these problems is given by the present invention as follows.

SUMMARY OF THE INVENTION

The present invention consists of a serially connected lubricator with foam-plugs and suitable lubricant, installed in the duct downstream of pushing/blowing cable launching equipment. The lubricator operates under pressure and the airflow needed to blow the cable is bypassed into the duct. Guide blocks to avoid buckling of the cable when pushed through the relatively large lubricating chamber are provided. The use of guide blocks is especially important for smaller diameter cable with less stiffness.

The lubricator includes a lubrication compartment that is pressurized with airflow from the launching apparatus. The foam plugs, saturated with a viscous lubricant, are placed in the compartment for engaging the cable. As the cable is run through the pressurized compartment, lubricant is wiped onto the cable as it moves in contact with the foam plugs.

DETAILED DESCRIPTION OF THE PREFERRED EMBODIMENTS

The invention will now be described on the basis of examples where cables are installed in protective underground cable ducts. Unless otherwise specified, all dimensions are given in metric units.

Figure 1:
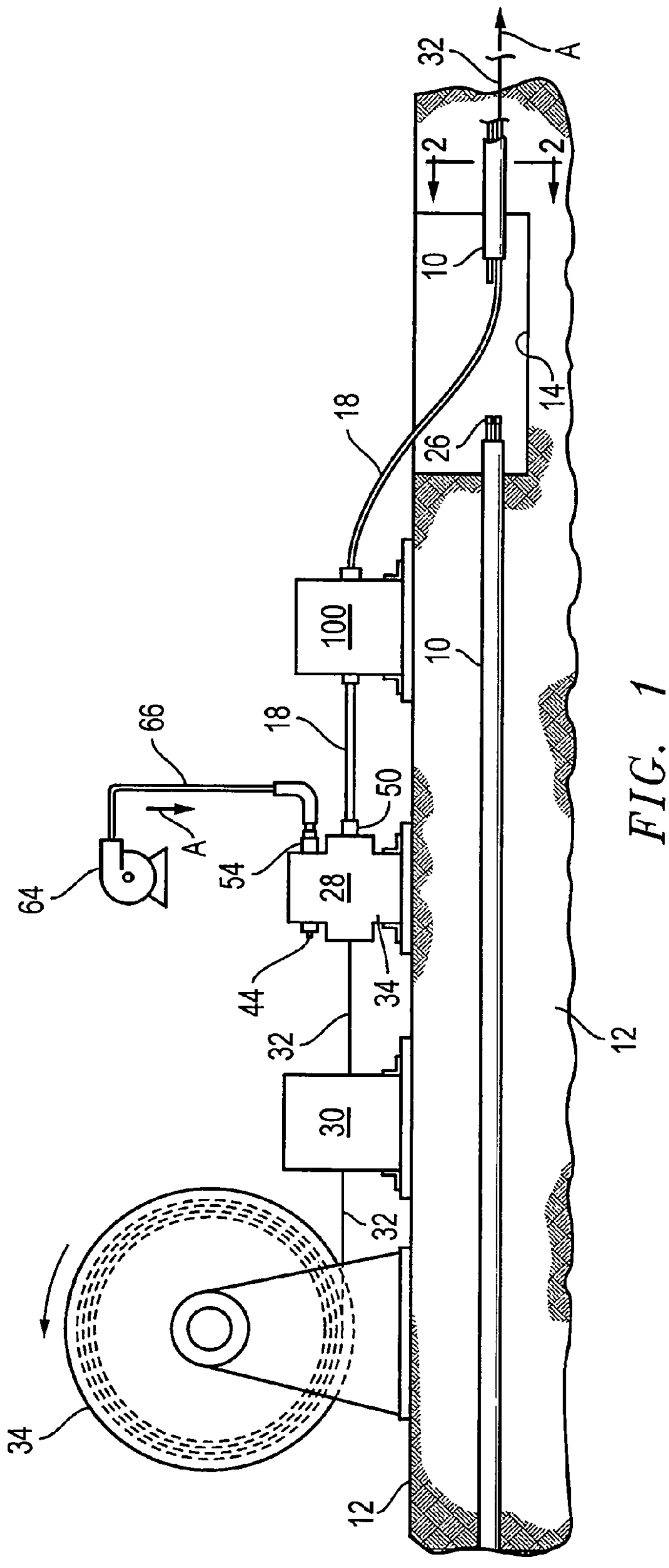
FIG. 1 is a simplified elevational view, partly in section, of a typical installation of optical fiber cable in a protective duct with cable launching equipment and a cable lubricator constructed according to the present invention.

A portion of a typical underground fiber optic conduit network is schematically shown in FIG. 1. The network includes a longitudinally extending trajectory duct 10 or conduit, typically made of a sturdy plastic material, e.g., one and a quarter, one and a half or two inches in diameter. The conduit 10 is buried in the ground 12 and is carrying small diameter guide tubes in which fiber optic cables are to be installed. The conduit 10 and its cables typically extend several thousand feet, and a launching station, such as at a hand-hole 14, is located at a pre-determined central location. Here guide-tubes 16, 18, 20, 22 and 24 extend out of the protective duct 10 (see also FIG. 2). In the hand-hole 14 also blowing/pushing equipment can be used in tandem operation. End caps 26 seal off the guide-tubes 20, 22, 24 where no cables have been installed.

A cable launching unit 28 is set up adjacent the hand-hole 14, in conjunction with a cable straightener unit 30, to introduce a fiber optic cable 32 into one of the guide tubes. A supply of new fiber optic cable, usually consisting of thousands of feet, is coiled or wound on a reel 34 positioned above ground. The cable 32 is unwound from the reel and is fed into the cable-straightening unit 30.

After the straightening step, the cable is fed into the cable launching unit 28, for example, a combination pushing and blowing cable insertion equipment of the type sold by Sherman & Reilly, Inc. of Chattanooga, Tenn., or as shown in U.S. Pat. No. 4,850,569, to which reference is made for whatever details described therein as may be necessary for the full understanding of the operation of the pushing and blowing unit.

The cable 32, coming from the straightener 30, is to be inserted into the underground guide tube 18. This is done with the synergetic blowing and pushing action of the insertion unit 28. Inside the housing 34 (two sections fastened together, see FIG. 5, only the bottom section of this equipment shown) the cable 32 is pushed by means of a mechanically (electric or pneumatic) driven wheel 36 that has an outer layer of machined hard metal with a groove for engaging the cable. In order to grip the cable a second (not mechanically driven) idler wheel 38 is pushed against the drive wheel 36. Pushing of the wheel 38, which can pivot on arm 40, is done via spring 42 by turning around the adjustment wheel 44 to control the pushing force of the drive wheel 38.

The cable 32 enters the housing 34 via a conical feed-through 46 that is cut to fit exactly the cable size. This feed-through is mounted on a splittable cylindrical entrance duct 48 that makes an airtight sealing when the housing is closed. The guide-tube 18 is received in a splittable cylindrical exit duct 49 also making airtight sealing. The guide tube 18 extends into the housing 34 until almost touching the wheels, to avoid buckling. Optionally the guide tube 18 can be mounted using a push/pull connector 50. Air is fed using a connection 52 via valve 54. The sections of the housing are closed with bolts and nuts through holes 56. For proper alignment, pin-and-holes 58 are used.

Referring again to FIG. 1, sources of compressed air and hydraulic power (or electric power) are connected to the cable feeder 28. Preferably, the compressed air A is provided by a compressor 64 through delivery conduit 66 at 175 to 375 cubic feet per minute (CFM) and 90 to 175 pounds per square inch (PSI). For the small size cables, installed in the guide tubes, in principle a capacity of 20 to 50 cubic feet per minute is sufficient.

An entrance duct clamp releasably holds the entrance duct for guiding the cable 32 toward the cable driver 36. Preferably, the entrance duct is a length of polyethylene tubing.

The air injection block 34 is provided with an entrance seal insert and an exit seal insert adapted to permit passage of the cable 32 while maintaining an airtight seal. The injection block 34, entrance seal insert and exit seal insert are each separable into two generally symmetrical halves to permit installation of the cable 32. The seal inserts are removable and replaceable with similar inserts adapted for different cable and conduit diameters. The entrance seal insert provides a passage slightly larger than the cable. A pair of gaskets is provided in the entrance seal insert to seal around the cable. A fitting is provided to permit injection of compressed air into the injection block 34.

The exit duct clamp is secured to the air injection block 34 to secure the duct to the injection block. The injection block defines a plenum 68 closed by the entrance seal insert and the exit seal insert. An end portion of the guide duct 18 is releasably held in the exit duct clamp. Preferably, the guide duct 28 is a length of cylindrical polyethylene tubing. A duct seal, such as a pair of gaskets, is provided to seal around the guide duct. The exit duct clamp and duct seal the injection block and guide duct to direct passage of air from the plenum into the guide duct.

Figure 2:
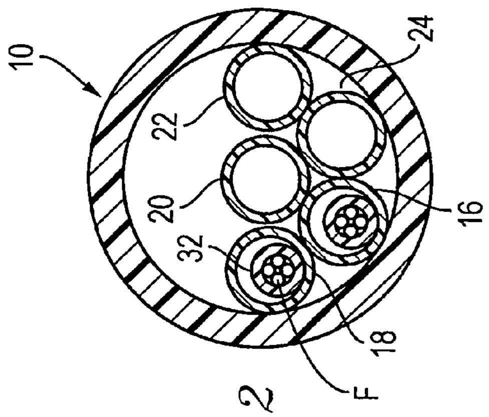
FIG. 2 is a sectional view through the protective duct taken along the line 2—2.
Figure 9:
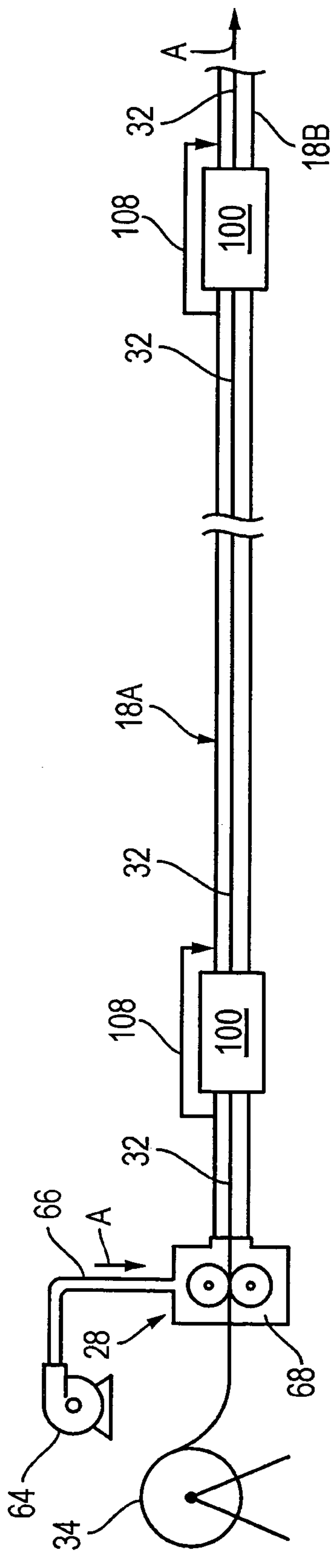
FIG. 9 is a simplified flow diagram showing a plurality of lubricators cascaded at spaced locations in a protective duct trajectory in which a cable is being installed by pushing and blowing equipment.

Referring to FIG. 1, FIG. 2 and FIG. 9, prior to installation of the cable into the guide duct 18, a leading end of the cable 32 is sealed with a smooth plug or end cap 33 having a diameter only slightly larger than that of the cable, e.g., made of brass, or other low friction material. The end cap 33 is attached to the cable preferably by a screw-threaded union, and is tapered or torpedo-shaped and rounded on end to avoid sticking of the cable in the guide tube.

To set up the cable feeder 28, as shown in FIG. 1 and 2, a length of cable is unrolled from the reel 34 and inserted in the entrance duct 48. The cable is positioned so that it extends from the end of the entrance duct approximately the length of the cable feeder. A cable 32 with the smooth end cap is inserted into the guide duct 18. The cable feeder is positioned adjacent the cable. The drive wheels, injection block, clamps and seal inserts are separated to provide a generally horizontal passage into which the cable is transversely inserted. The separated parts are then reassembled, closed, and secured to the entrance duct, cable, and guide duct in the cable feeder.

The compressed air source, hydraulic source, and/or electric power are connected and initiated to pressurize the plenum 68 and to activate the hydraulic system and the control system. Compressed air A flows at high speed along the cable, propelling the cable through the guide duct. The actuator is switched on to provide hydraulic fluid (or compressed air or electric power) to the motors, and the drive wheels rotate, advancing the cable 32 through the conduit 18.

Figure 3:
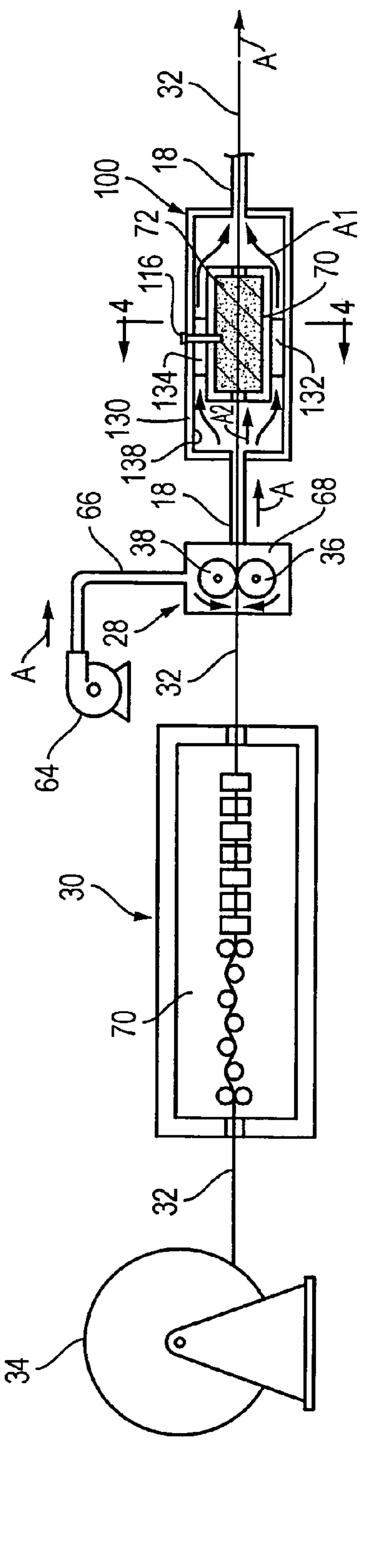
FIG. 3 is a simplified schematic representation of cable launching equipment of FIG. 1 showing one embodiment of the cable lubricator.
Figure 5:
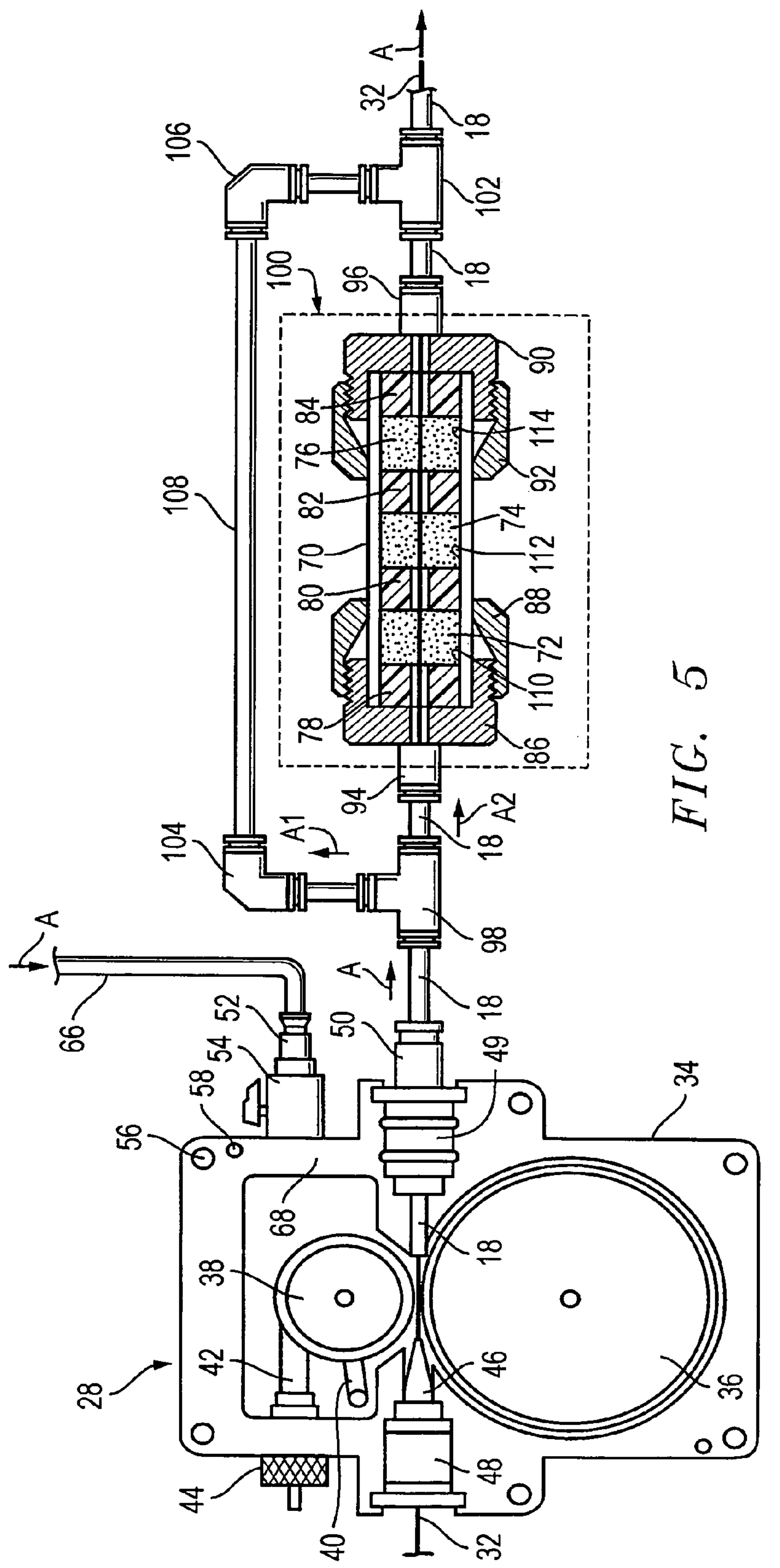
FIG. 5 is a simplified elevational view, partly in section, of conventional cable pushing/blowing equipment and an alternative embodiment of the lubricator shown in FIG. 1, with airflow bypass.

According to the present invention, after the cable 32 exits the cable launching equipment 28 but prior to entry into the guide tube 18 in the protective underground duct 10, the cable 32 is lubricated by running it through a pressurized lubricator unit 100 as shown in FIG. 1, FIG. 3 and FIG. 5. Field-testing has demonstrated that the coefficient of friction of rubbing engagement of the cable against a protective duct (or guide tube) is a major limiting factor in determining how far a cable can be blown-in. Maximum blowing distance can be obtained when the blowing force equals the frictional force resisting movement of the cable. Consequently the maximum blowing distance varies substantially linearly with the coefficient of friction (through straight duct trajectories). It has been demonstrated by field testing that lubrication of the cable, under pressurized duct conditions, can substantially reduce the coefficient of friction in the duct, yielding a surprising increase in blowing distance by a factor of 10 or more as compared with the non-lubricated case.

Referring again to FIG. 1 and FIG. 2, a schematic representation is given of cable blowing equipment 28 in combination with the cable lubricator 100. The cable straightener 30 may be used in combination with relatively large cables having a large diameter (e.g., 3.9–5.0 mm) exceeding a certain minimum size, e.g., in the range of from 1.6 to 2.0 mm and smaller diameters, but is not preferred for use on the smaller cables.

In the preferred embodiment, micro-cables 32 with diameters ranging from 1.6 to 2.0 mm have been blown into guide tubes 16, 18 having an outer diameter of 4 mm. In this embodiment, each cable contains two optical fiber strands F embedded in a UV-acrylate matrix reinforced with strands of aramid yarn and enclosed in a protective polymer jacket. In an alternative embodiment, each cable contains four optical strands F and a gel waterproofing material, for example silicone gel or aquagel, enclosed in a protective polymer jacket. In yet another cable embodiment, the fibers F are enclosed within a small diameter, thin sidewall laser-welded steel tube. This metal tube is loosely filled with one or more optical fibers and a gel waterproofing material, and a protective tubular jacket of (foamed) high-density polyethylene (HDPE) surrounds the small diameter steel tube.

The cable 32 is blown into the guide tube 18 using the cable blowing equipment 28, such as is described in U.S. Pat. No. 6,682,052 entitled "Optical Cable Installation with Mini-Bend Reduction," by Griffioen et al., which is assigned to the owner of the present invention, and is incorporated herein by reference. Immediately after the blowing equipment the cable lubricator 100 is placed, coupled to a lead-in section of the guide tube, and this lead-in section is extended, also by couplings, to the guide tube 18 into which the cabic has to be installed.

Figure 6:
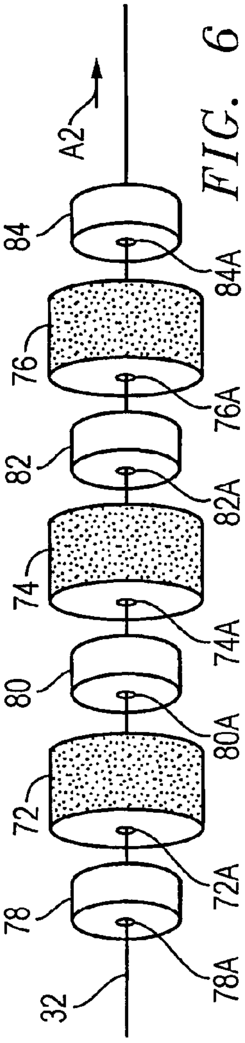
FIG. 6 is an exploded perspective view of the internal components of the lubricator shown in FIG. 5.
Figure 7:
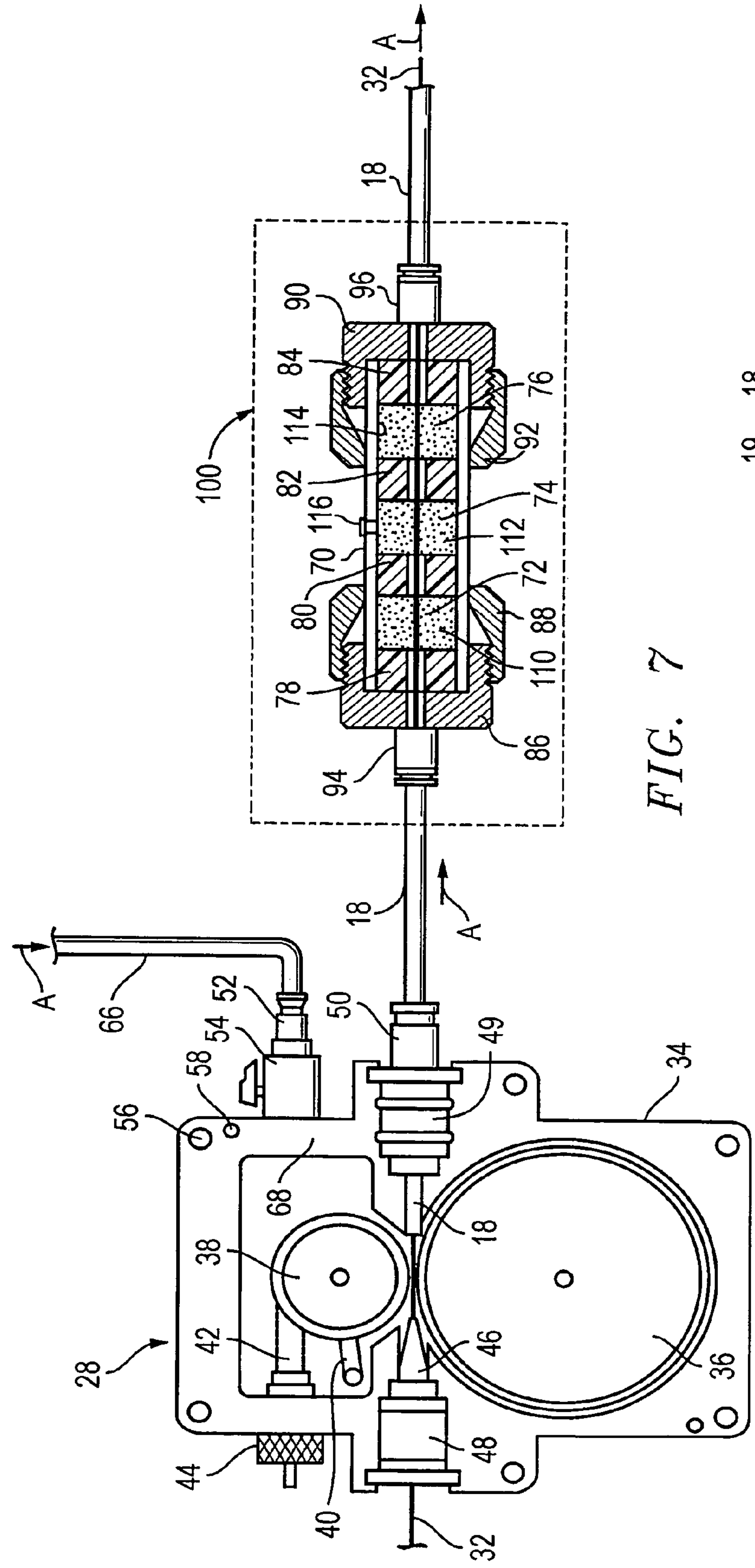
FIG. 7 is a simplified elevational view, partly in section, of conventional cable pushing/blowing equipment and an alternative embodiment of the lubricator shown in FIG. 1, without airflow bypass.

In the exemplary embodiment shown in FIG. 5 and FIG. 7 the cable lubricator 100 consists of a cylindrical sidewall section of high density polyethylene (HDPE) duct 70 with an outer diameter of 40 mm and an internal cylindrical bore 71 forming a lubrication compartment into which compressed foam-plugs 72, 74, 76 (the size before compression, by a factor of about 3, shown in FIG. 6) and cylindrical cable guiders 78, 80, 82 and 84 are placed. The ends of the duct-housing 70 are closed air-tight (but not sealing the air flow in the longitudinal direction) using threaded duct-couplings 86, 88 and 90, 92 on which tubular connector fittings 94, 96 to the 4 mm guide tubes have been mounted.

In the preferred embodiment, a large fraction A1 of the pressurized airflow A is shunted or bypassed around the lubricator into the duct via T-connectors 98,102, angled connectors 104, 106 and a bypass conduit 108. The smaller remainder fraction A2 of the pressurized airflow passes through the longitudinal airflow passage of the lubricator compartment 71 in contact with the foam-plug applicators 72, 74 and 76.

The cable 32 is pushed through the cable lubricator 100 in wiping contact with the foam plugs during blowing. To eliminate buckling of the cable in the relatively large space (compared to the 4 mm diameter guide tube) of the 40 mm diameter lubrication compartment 71, the cable is guided at several places within the compartment. The bore size of the 4 mm tube connectors 94, 96 and duct-coupling 86, 90 is formed a little larger than the cable, in this embodiment 2.5 mm. Wiping apertures 72A, 74A and 76A have been punched into the foam-plugs before mounting.

To further eliminate cable buckling, cylindrical guide blocks 78, 80, 82 and 84, made of a rigid plastic material such as nylon, are placed in the lubrication compartment in interleaved relation with the foam plugs. Radial deflection of the cable as it moves through the lubrication compartment is limited by passing the cable through guide apertures 78A, 80A, 82A and 84A formed through the cable guide blocks. Also here the size of the guide apertures in the cable guide blocks is 2.5 mm. The guide apertures have conical counterbore inlet pockets to ease pushing of a (new) section of cable through the cable lubricator. The longitudinal dimensions of the cable guide blocks 78, 80, 82 and 84 are chosen long enough such that tilting of the guide blocks in the duct housing 70 is avoided sufficiently to guide the cable without kinking. These lengths may be shorter when the cable guide blocks are supported and fixed in the lubricator.

The cable guide blocks 78, 80, 82 and 84 also divide or partition the cable lubricator compartment into separate sub-compartments 110, 112 and 114. In this way it becomes possible to start with a "very wet" (saturated) foam-plug 72, in order to be sure that enough lubricant is applied and to provision the reservoir with as much lubricant as possible. The first compartment 110 could also contain lubricant only, without a foam-plug, and the last compartment 114 would contain a "just wet" foam-plug 76. The foam-plugs 74 in between can vary from "wet" to "dry."

Preferably, each foam plug is a little less "wet" starting from the first "wet" foam plug 72, thereby forming a lubrication gradient within the pressurized lubrication passage. This arrangement applies a thin film of lubricant rather than a thick viscous layer that would cause the cable to stick to the duct sidewall. Also, this arrangement ensures a transfer of lubricant from the more-wet compartments to the less-wet compartments, thus avoiding prematurely drying out of the less-wet foam plugs.

Installation of the cable lubricator 100 is accomplished as follows. The T-connectors 98,102, duct-couplings 86,88, duct-housing 70, foam-plugs 72, 74, 76 and cable guiders 78, 80, 82, 84 are first shifted in order over the cable 32. Then the cable-guiders and the foam-plugs are pressed into the duct-piece (the foam-plugs have to be squeezed and compressed for proper fitting). Next the duct-couplings are screwed to the duct housing. Finally the air-bypass conduit is connected to the T-connectors to complete the cable lubricator. Then the cable 32 can be blown into guide tubes connected to the cable lubricator.

For new installations the cable 32 is cut in front of the cable lubricator 100 and a new lead-in section of guide tube is connected. When the cable reel is empty a new cable can be mechanically coupled to the old cable and pushed through the cable straightener 30, cable blowing equipment 28 and cable lubricator 100. It is also possible to use a straight rod, which is pushed through an empty cable lubricator without opening it, attach the cable to it, and then pull the cable through the lubricator.

When all lubricant is used or the foam plugs become too dry to be effective, the cable lubricator can be opened and refilled through a sealable access port, for example via a screw cap fitting 116 (FIG. 3 and FIG. 4), mounted air-tight and extending through the bypass housing 130. It is also possible to use a lubricating nipple with an internal check valve for refill. The lubricant should be a viscous lubricating material that can flow and be absorbed into a fluid permeable applicator. Various lubricants are available from commercial sources and can be used for cable lubrication purposes. However, a water-based emulsion lubricant sold by American Polywater Corporation of Stillwater, Minn. under its trademark Polywater® Prelube™ 2000 is preferred. That lubricating material has the consistency of hand lotion under ambient conditions and is readily absorbed into open cell plastic foam materials, natural sponges, woven fiber wicks and other fluid permeable applicator materials.

Various fluid permeable materials can be used to fabricate the lubricant applicator plugs, including synthetic foams, natural sponges and woven fiber wicks. In the preferred embodiment, the preferred fluid permeable applicator material is a resilient cellular plastic foam, such as open cell polyether or polyester polyurethane foam, rubber latex, and polyethylene or vinyl polymers. When a polyurethane foam is used, the foam has a nominal density in the range of about 0.6 to about 1.2, preferably about 0.8 to about 1.0 pounds per cubic foot, and an indentation force deflection (IFD) in the range of about four to about 15, preferably about eight to about 12 pounds. (Test Method ASTM D3574)

The nominal density in pounds per cubic foot (PCF) polyurethane foam applicator material in one embodiment as measured according to ASTM D3574 is 0.5 to 5 PCF, in one embodiment 0.75 to 2 PCF, and in one embodiment 1.25 to 1.35 PCF. The foam firmness measured in terms of indentation force deflection (IFD) under ASTM D3574. Also, referred to as initial load deflection (ILD), for the foam plug material in one embodiment is 15 to 100 lbs., in one embodiment 45 to 55 lbs., and in one embodiment 50 to 52 lbs., respectively. Open cell foams, having the foregoing range of densities and ILD values are compressible under mechanical pressure and will return to their original shape when the pressure is removed.

The cable lubricator 100 can function well with bypass airflow A1 as shown in FIG. 3 and FIG. 5, applying a thin film of lubricant on the cable jacket. In these embodiments bypass airflow is provided by the conduit 108 that is coupled in parallel airflow relation with the lubricator airflow passage 71 for diverting substantially all of the pressurized airflow around the applicator and into the duct for blowing-assisted transport of the cable through the duct trajectory.

Figure 4:
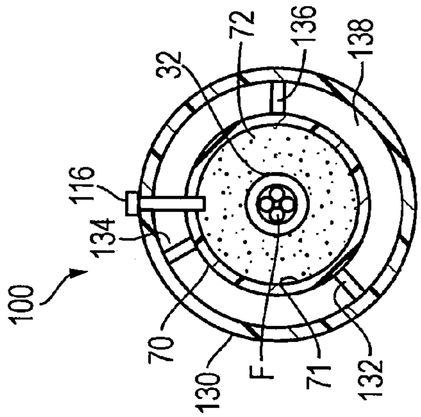
FIG. 4 is a sectional view through the lubricator taken along the line 4—4.

Bypass airflow is also provided by the alternative lubricator embodiment shown in FIG. 3 and FIG. 4. In this arrangement, the airflow bypass means is formed by a large diameter housing shell 130 that completely encloses the lubricator housing 70. The lubricator is radially spaced from the tubular housing and is held in cable-running alignment with the housing shell by radial spacer fins 132, 134 and 136. The annulus 138 between the housing shell and lubricator housing 70 forms a bypass airflow passage for conveying a large fraction A1 of the pressurized airflow from the launch apparatus 28 into the guide tube 18.

In this alternative embodiment the airflow passage of the lubricator is pressurized by a relatively small airflow A2. Only a single foam-plug absorbent applicator 72 is placed in the lubricant reservoir housing for wiping lubricant onto the cable 32 as it moves through the pressurized airflow passage 71. This arrangement may be used for running relatively stiff cable for which cable-guiders are not needed, e.g., fiber optic cable in which the fibers are enclosed in small diameter steel tubing.

It is also possible to block or eliminate the bypass airflow as shown in FIG. 7, whereby the entire pressurized airflow A is discharged through the lubricator 100. In that case a sufficient amount of pressurized air will still flow through the holes in the duct-couplings and cable-guiders, and also through the foam-plugs, to propel the cable through the guide tube.

Figure 8:
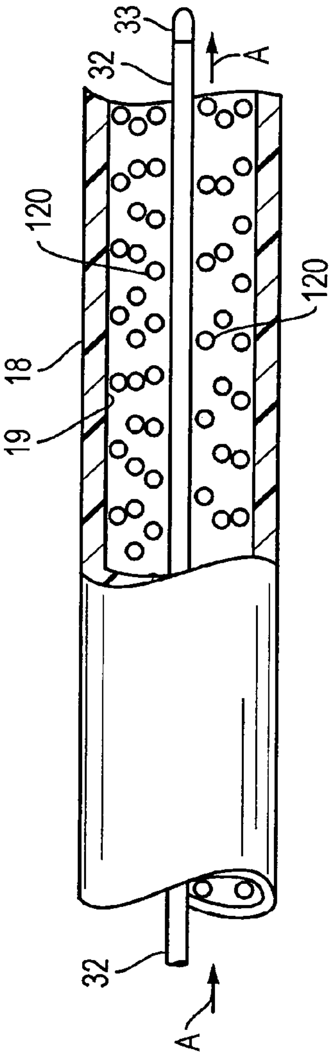
FIG. 8 is an elevation view, partly in section, of a guide tube in which lubricant droplets, produced by the lubricator of FIG. 7, are entrained as an aerosol mixture in the pressurized airflow discharged from the lubricator as the cable is inserted through the guide duct.

With full airflow through the lubricator (FIG. 7), small lubricant droplets 120 are stripped away from the foam plugs and become entrained in the pressurized airflow as a "shower" of lubricant droplets, thus forming an aerosol mixture that lubricates the bore 19 of the guide tube 18 as the droplets disperse through the guide tube, as shown in FIG. 8. The nature of this "shower" depends on the air pressure, length of the guide tube in which the cable is installed and on the lubricant filling of the cable lubricator. Trial and error will determine the parameters for best lubricating effect by this method.

It is also possible, by using a splittable duct access fitting, to place one or more additional cable lubricators 100 further in the duct trajectory, for example in series with tandem duct sections 18A and 18B as shown in FIG. 9. In this cascade arrangement of lubricators, where the mechanical pushing forces provided by the initial cable launching equipment 28 may be absent or very small, the friction forces of the cable through the cable lubricator will be low enough to allow the viscous forces of the bypass airflow A1 to compensate for the reduced pushing force at the remote locations.

Figure 10:
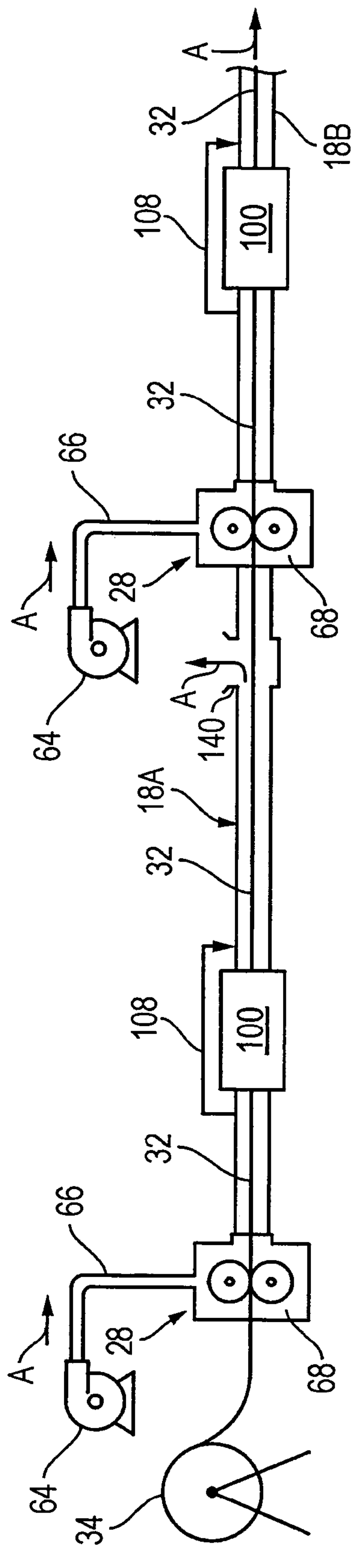
FIG. 10 is a simplified flow diagram showing a plurality of lubricators installed at spaced locations in a protective duct trajectory in which a cable is being installed by a cascaded installation of pushing and blowing equipment.

Also additional pushing/blowing equipment 28, 64 with an additional lubricator 100 can be placed further in the duct trajectory, blowing and lubricating in tandem (cascade). This can be done at one or more remote operative positions in the tandem duct sections 18A and 18B of the duct trajectory downstream of the initial cable launching equipment 28, as shown in FIG. 10. There is a vent fitting 140 installed in the duct section 18A just before reaching the second blowing station. The vent 140 exhausts the pressurized airflow A from the first blower out of the duct section 18A before it reaches the second duct section 18B.

According to this vented duct arrangement there is no airflow communication between the duct sections, since there is no practical way to combine the airflow from the first blower into the plenum of the second blower. The airflow and pushing forces from the first blowing station supplies the needed propelling forces for the cable over the first duct section 18A. The second launching apparatus will also propel the cable, but the new airflow provided by the second blower is only effective in the second duct section 18B, downstream of the second blower.

EXAMPLES

These tests were performed with the FIG. 5 lubricator embodiment (air bypass open). Blowing was done with 10 bars air-pressure unless otherwise specified. In all experiments the guide tubes were open at 585 meters from the point where the cable is launched.

Example 1

PBTP 2.0 mm Cable in Un-Lubricated Ribbed 4 mm Tube

First attempt: Un-lubricated installation. Blowing transport of cable started with a rate of advance of 35 m/min but stopped because of frictional resistance after reaching only 50 m in the duct trajectory.

Second attempt: Lubricating the tube with water-based lubricant and a foam-plug blown through. Blowing transport of cable started with a rate of advance of 35 m/min and the speed had dropped to 7 m/min after reaching 225 m in the duct trajectory.

Third attempt: Using the cable lubricator (and another unlubricated tube). Blowing started with 35 m/min and the speed had dropped to 8 m/min after reaching 500 m in the duct trajectory.

Example 2

Nylon 1.8 mm Cable in Pre-Lubricated Ribbed 4 mm Tube

First attempt: Installation with no further lubricating. Blowing started with 35 m/min and the speed dropped to 5 m/min at reaching 235 m in the duct trajectory.

Second attempt: Using the cable lubricator (and another unlubricated tube). Blowing started with 35 m/min and the speed was still the same upon reaching 585 m in the duct trajectory while the pressure was only 7 bars.

The effect of post-launch lubrication with the pressurized cable lubricator 100 is an improvement by a factor of 10 or more in blowing length with respect to the non-lubricated case. Moreover the blowing results reproduce better when using the cable lubricator. The blowing distance improvement of the cable lubricator is also much more striking than the improvement of lubricating the guide tubes alone (or using pre-lubricated tubes), which was an unexpected and surprising improvement.

For the sake of completeness, it is further noted that the lubrication method of the invention is suitable for installing copper wire cables and power cables as well as optical fiber cables.

Although the invention has been described with reference to certain exemplary arrangements, it is to be understood that the forms of the invention shown and described are to be treated as preferred embodiments. Various changes, substitutions and modifications can be realized without departing from the spirit and scope of the invention as defined by the appended claims.

We claim:

1. A method for installing a cable in a duct wherein the cable is inserted by a launching apparatus including a source of pressurized air for propelling the cable at least in part by pressurized air blowing-assisted transport through the duct, comprising the steps:

connecting the launching apparatus in airflow communication with the duct through the lubrication compartment of a cable lubricator, pressurizing the lubrication compartment with pressurized airflow from the launching apparatus;

running the cable through the lubrication compartment and into the duct; and lubricating the cable with a lubricant contained in the lubrication compartment as the cable moves through the lubrication compartment.

2. A method for installing a cable in a duct as set forth in claim 1, including the step:

diverting a substantial fraction of the pressurized airflow around the lubrication compartment and injecting it into the duct downstream of the cable lubricator.

3. A method for installing a cable in a duct as set forth in claim 1, wherein the lubricating step is performed by running the cable in wiping contact against a lubrication applicator disposed in the lubrication compartment.

4. A method for installing a cable in a duct as set forth in claim 1, including the step:

limiting deflection of the cable as it moves through the lubrication compartment.

5. A method for installing a cable in a duct as set forth in claim 4, wherein the limiting step is performed by guiding the cable through apertures formed in guide blocks contained in the lubrication compartment.

6. A method for installing a cable in a duct as set forth in claim 1, wherein the lubricating step is performed by contacting the cable against an applicator that is saturated with a viscous lubricant.

7. A method for installing a cable in a duct as set forth in claim 1, wherein the lubricating step is performed by running the cable in contact with viscous lubricant contained in a reservoir inside of the lubrication compartment.

8. A method for installing a cable in a duct as set forth in claim 1, wherein the lubricating step is performed by running the cable in wiping contact against two or more applicators having a viscous lubricant content varying from saturated to unsaturated.

9. A method for installing a cable in a duct as set forth in claim 1, including the step of stripping droplets of lubricant from a reservoir of viscous lubricant contained in the lubrication compartment and entraining the droplets in pressurized air flowing trough the lubrication compartment.

10. A method for installing a cable in a duct as set forth in claim 1, including the steps:

pressurizing the lubrication chamber with the full pressurized airflow output of the pressurized air source;

supplying lubricant to an applicator from a reservoir of viscous lubricant contained in the lubrication compartment; and contacting the cable against the applicator as the cable moves through the lubrication compartment.

11. A method for installing a cable in a duct as set forth in claim 1, including the steps:

pressurizing the lubrication chamber with pressurized airflow from the pressurized air source;

bypassing a substantial fraction of the pressurized airflow around the lubrication compartment into the duct downstream of the cable lubricator;

supplying lubricant to an applicator from a reservoir of viscous lubricant contained in the lubrication compartment; and contacting the cable against the applicator as the cable moves through the lubrication compartment.

12. A method for installing a cable in a duct wherein the cable is inserted by launching apparatus including a source of pressurized air for propelling the cable at least in part by pressurized air blowing-assisted transport through the duct, comprising the steps:

connecting the launching apparatus in airflow communication with the duct through the lubrication compartment of a cable lubricator;

running the cable through the lubrication compartment before the cable enters the duct; and lubricating the cable with a lubricant contained in the lubrication compartment as the cable moves through the lubrication compartment.

13. A method for installing a cable in a duct as set forth in claim 12, including the step:

bypassing a fraction of the pressurized air around the lubricator and discharging it into the duct downstream of the lubricator for blowing-assisted transport of the cable through the duct.

14. A method for installing a cable in a duct as set forth in claim 12, including the steps:

supplying lubricant to an applicator from a reservoir of viscous lubricant contained in the lubrication compartment; and guiding the cable in wiping contact against the applicator as the cable moves through the lubrication compartment.

15. A method for installing a cable in a first section and a second section of a duct trajectory wherein the cable is inserted by launching apparatus including a source of pressurized air for propelling the cable at least in part by pressurized air blowing-assisted transport through the duct trajectory, comprising the steps:

connecting the launching apparatus in airflow communication with the first duct section through the lubrication compartment of a first lubricator;

running the cable through the lubrication compartment of the first lubricator and applying lubricant on the cable as it moves through the lubrication compartment;

diverting a substantial fraction of the pressurized airflow around the first lubricator and into the first duct section downstream of the first cable lubricator for blowing-assisted transport of the cable through the first duct section;

connecting the first duct section in airflow communication with the second duct section through the lubrication compartment of a second lubricator;

running the cable through the lubrication compartment of the second lubricator and applying lubricant on the cable as it moves through the lubrication compartment; and bypassing a substantial fraction of the pressurized airflow conveyed through the first duct section around the second lubricator and into the second duct section downstream of the second cable lubricator for blowing-assisted transport of the cable through the second duct section of the duet trajectory.

16. A method for installing a cable in a first section and a second section of a duct trajectory comprising, in combination:

installing a first cable launching apparatus including a first source of pressurized air in an operative position between a supply of cable to be installed and the first duct section for propelling the cable at least in part by pressurized air blowing-assisted transport through the first duct section;

connecting the first cable launching apparatus in airflow communication with the first duct section through the lubrication compartment of a first lubricator;

running the cable through the lubrication compartment of the first cable lubricator and applying lubricant on the cable as it moves through the lubrication compartment of the first lubricator;

installing a second cable launching apparatus including a second source of pressurized air in an operative position between the first duct section and the second duct section for propelling the cable at least in part by pressurized air blowing-assisted transport through the second duct section;

connecting the second launching apparatus in airflow communication with the second duct section through the lubrication compartment of a second lubricator;

running the cable through the lubrication compartment of the second lubricator and applying lubricant onto the cable as it moves through the lubrication compartment of the second lubricator; and propelling the cable at least in part by pressurized air blowing-assisted transport through the second duct section.

17. A method for installing a cable as set forth in claim 16, including the step:

venting pressurized air out of the first duct section at a location near the point where the cable enters the second launching apparatus.

18. A method for lubricating a cable as it is being propelled at least in part by pressurized air blowing-assisted transport, comprising the steps:

providing a lubricator having an interior passage allowing movement of a cable through the lubricator;

pressurizing the lubricator passage with pressurized airflow from a source of pressurized air;

propelling a cable through the lubricator passage; and contacting the cable with lubricant as the cable moves through the lubricator passage.

19. A method for installing a cable in a duct wherein the cable is inserted by launching apparatus including a source of pressurized air for propelling the cable at least in part by pressurized air blowing-assisted transport through the duct, comprising the steps:

connecting the launching apparatus in airflow communication with the duct through the lubrication compartment of a lubricator;

pressurizing the lubrication compartment with pressurized airflow;

running the cable through the lubrication compartment and applying lubricant onto the cable as it moves through the lubrication compartment;

bypassing a substantial fraction of the pressurized airflow around the lubricator and discharging it into the duct downstream of the lubricator for blowing-assisted transport of the cable trough the duct; and exhausting pressurized air out of the duct at a remote location downstream of the lubricator.

* * * * *